United States Patent Office 3,398,791
Patented Aug. 27, 1968

3,398,791
OIL RECOVERY PROCESS WITH SURFACE-ACTIVE AGENTS FORMED IN SITU BY INJECTION OF GASES
Billy G. Hurd, Dallas, Tex., assignor to Mobil Oil Corporation, a corporation of New York
No Drawing. Filed Dec. 22, 1966, Ser. No. 603,720
18 Claims. (Cl. 166—9)

This invention relates to the recovery of oil from subterranean oil reservoirs and, more particularly, to new and improved methods of forming surface-active agents within such reservoirs in waterflood operations.

In the production of oil from oil bearing formations it usually is possible to recover only a minor portion of the original oil in place by the primary recovery methods which utilize only the natural forces present in the reservoir. Thus, a variety of the so-called secondary recovery methods have been employed in order to increase the recovery of oil from subterranean reservoirs. Generally, the most promising of these secondary recovery methods fall within the general classification of waterflooding. In waterflooding, an aqueous flooding medium is introduced into the reservoir in order to displace the oil therein to a suitable production system through which the oil may be withdrawn to the surface of the earth. The aqueous flooding medium may be either brine or fresh water and may, or may not contain various additives.

Among the techniques employed for increasing the efficiency of a waterflood process are those in which surface-active agents are added to the flooding medium in order to control the interfacial tension between the water and the reservoir oil. While these agents may greatly increase the total amount of oil recovered, their use many times is prohibitively expensive because of the tendency of the surface-active agents to adsorb out of solution onto the rock surfaces of the reservoir. Thus, the advancing front of the aqueous flooding medium is depleted of the surface-active agents before significant beneficial effects of such agents can be realized.

In order to overcome the problems presented by this adsorption phenomenon, it has been proposed to produce surface-active agents within the reservoir undergoing treatment. Thus, in U.S. Patent No. 3,167,119, to V. G. Meadors, there is disclosed a technique wherein surface-active sulfonic acids are formed in situ by the injection of acids containing a sulfo group. More specifically, the Meadors patent discloses the injection of materials such as sulfuric acid and sulfur trioxide in order to establish a bank of concentrated acid adjacent the injection well or wells.

While the in-situ production of organic sulfonic acids in waterflooding operation shows some promise, the injection of sulfuric acid into subterranean formations often is impractical. In this regard, the introduction of sulfuric acid into permeable formations, particularly those containing even small amounts of calcium, often results in serious plugging of the formation due to the formation of insoluble precipitates of calcium sulfate and hydrous oxides as acid is depleted in the liquid acid front. This same difficulty is presented by the injection of sulfur trioxide since the sulfur trioxide reacts quickly with the connate water within the formation to form a bank of sulfuric acid adjacent the injection well. Thus, the end result of injecting sulfur trioxide into a reservoir is much the same as in the direct injection of sulfuric acid.

In accordance with the present invention, there is provided a new and improved method of producing surface-active agents within a reservoir by the conversion of certain constituents of the reservoir oil to surface-active sulfoxy acids and which does not result in serious plugging of the formation adjacent the water injection system.

The present invention is practiced in a subterranean oil reservoir which contains water therein and is penetrated by spaced injection and production systems which define the recovery zone of the reservoir. In carrying out the invention gaseous sulfur dioxide and an oxygen-containing gas are introduced into the recovery zone of the reservoir, preferably through the water injection system, and into contact with the water within the recovery zone. The injected sulfur dioxide and oxygen react with the water within the reservoir to form sulfuric acid. However, because of the relatively limited solubility of the sulfur dioxide and oxygen in the water and the relatively low rate of reaction leading to the formation of sulfuric acid, the sulfuric acid produced is distributed widely through the recovery zone of the reservoir and is not limited to the vicinity of the injection system. The sulfuric acid reacts with various constituents of the crude oil to produce surface-active organic sulfoxy acids. Subsequent to the injection of the sulfur dioxide and oxygen-containing gas, an aqueous flooding medium is introduced into the recovery zone via the injection system in order to displace oil within the reservoir to the production system. Such oil then is withdrawn from the reservoir to the surface of the earth through the production system.

In a preferred embodiment of the present invention, the aqueous flooding medium comprises an alkaline solution in order to effect a neutralization of the initially formed sulfoxy acids. Preferably, the alkaline solution comprises an aqueous solution of a base selected from the class consisting of the alkali metal and ammonium hydroxides and carbonates. The use of these inorganic bases results in the production of anionic surface-active agents which exhibit a relatively small tendency, in comparison with nonionic surface-active agents, to become adsorbed out of solution within the interstices of the reservoir.

In order to enable those skilled in the art to better understand the invention, there is provided hereinafter a detailed description including certain specific examples and preferred embodiments of the invention.

As noted previously, the present invention is carried out in a recovery zone of a subsurface oil-bearing reservoir. As will be understood by those skilled in the art, by the term "recovery zone" as used herein and in the appended claims is meant that portion of a reservoir through which oil is displaced to the production system by the injected flooding medium. The injection and production systems may compromise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type pattern the recovery zone as defined by the spaced rows of injection and production wells generally will be that portion of the reservoir underlying the area between these spaced rows. Exemplary of other patterns which may be used is the so-called "circular flood" pattern in which the injection system comprises a central injection well and the production system a plurality of production wells spaced radially about the injection well. Of course, the injection and production systems each may consist of only a single well in which case the recovery zone as defined by the spaced injection and production wells will be the portion of the reservoir underlying a generally elliptical area between these wells which is subject to the displacing action of the injected flooding medium. The above and other patterns are well known to those skilled in the art and for a more detailed description of such patterns, as well as waterflood techniques in general, reference is made to Uren L. C., Petroleum Production Engineering—Oil Field Exploitation, 2nd ed., McGraw-Hill Book Company, Inc., New York and London, 1939, and more particularly to the section entitled, "The Water Flooding Process," appearing at pages 444–459.

It also will be recognized that the invention may be carried out utilizing one or more dually completed injection-production wells of the type, for example, disclosed in U.S. Patent No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more duly completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

In carrying out the invention, gaseous sulfur dioxide and an oxygen-containing gas are introduced into the recovery zone of the reservoir. These materials may be introduced into the recovery zone by any suitable technique, such as through the injection system, through the production system, or through wells located intermediate of the wells comprising the injection and production systems. However, it is preferred in carrying out the invention to introduce the gaseous sulfur dioxide and the oxygen-containing gas through the water injection system. This will tend to establish an initial trend of fluid flow within the reservoir in the direction of the production system and, in addition, will tend in certain instances, as described in detail hereinafter, to establish favorable conditions of water and gas saturation adjacent the injection system.

The injected sulfur dioxide and oxygen react with the water within the reservoir to form sulfuric acid which, in turn, reacts with certain constituents of the reservoir oil to form sulfoxy acids. More particularly, the sulfuric acid reacts with compounds such as the aromatic and olefinic constituents of the reservoir oil to produce sulfoxy acids such as the sulfonates, characterized by the —$SO_2OH$ group, or the sulfates, characterized by the —$OSO_2OH$ group.

Sulfuric acid may be formed within the reservoir by two mechanisms. As the sulfur dioxide flows through the formation and contacts the formation water, it reacts slowly with such water to form sulfurous acid. In the oxidizing environment provided by the injected oxygen, the sulfurous acid in turn is oxidized to sulfuric acid. This latter reaction normally will be catalyzed by copper or cobalt ions which commonly are present in trace amounts in oil field waters. Also, a portion of the injected sulfur dioxide may be oxidized directly to sulfur trioxide, which is in itself an effective sulfonating agent, and which dissolves in the formation water to form sulfuric acid.

It will be recognized that the gases utilized in the present invention are plentiful and inexpensive. The oxygen requirements may be satisfied by the injection of air although other oxygen-containing gases such as oxygen-enriched air or even pure oxygen may be used. Likewise, sulfur dioxide usually will be readily available. For example, elemental sulfur is a common oil-field byproduct and sulfur dioxide may be obtained by burning such sulfur at the injection site. While some sulfur trioxide will result from the combustion of sulfur, it usually will be in small amounts, e.g., less than ten percent by volume of the sulfur dioxide produced and normally on the order of four percent, and the combustion products usually can be injected directly without significant plugging of the formation.

The sulfur dioxide and oxygen-containing gas may be injected simultaneously or separately. In some cases, particularly in those circumstances where unusually high bottomhole temperature conditions exist, it will be preferred to inject the sulfur dioxide and oxygen-containing gas separately in order to avoid the formation of appreciable amounts of sulfur trioxide within the injection system and within the reservoir immediately adjacent the injection system. Where the sulfur dioxide and oxygen are to be injected separately it is preferred to precede the oxygen-containing gas with the sulfur dioxide in order to avoid appreciable oxidation of the formation oil. Also, it usually will be desired to inject each of these materials as a plurality of alternate slugs. Thus, it is preferred to inject first a slug of sulfur dioxide followed by a slug of oxygen-containing gas and to repeat this procedure with alternate slugs of sulfur dioxide and oxygen-containing gas until the desired amounts of these materials are introduced into the recovery zone of the reservoir.

As noted previously, the present invention avoids substantial plugging of the reservoir by calcium sulfate and hydrous oxide precipitates as may occur due to the injection of sulfuric acid or sulfur trioxide. In addition, the invention greatly enhances the volume of reservoir contacted by the sulfonating agent. In this regard, the sulfur dioxide and oxygen-containing gas, because of their relatively high mobility and their inherent tendency to expand and fill the confining reservoir space, will tend to penetrate throughout the gas permeable space of the recovery zone. In order to provide for significant contact between the sulfonating agent and oil throughout the recovery zone, it is preferred to carry out the present invention in an oil reservoir which has been depleted sufficiently to give a high gas saturation, preferably on the order of 30 percent or more within the recovery zone. In addition, the high gas saturation in a reservoir will increase the relative permeability thereof to gas and thus increase the injectivity of the reservoir with respect to the introduction of the gaseous reagents.

From the foregoing description, it will be recognized that the present invention requires the presence of some water within the recovery zone of the reservoir. Therefore, in order to provide for the production and distribution of adequate amounts of sulfuric acid throughout the reservoir it is preferred to carry out the invention in a reservoir exhibiting a water saturation of at least ten percent of the pore volume. On the other hand, excess water saturation will result in a decreased relative permeability to gas and, in addition, will result in the formation within the reservoir of a relatively dilute sulfuric acid solution. Therefore, it is preferred to carry out the invention in a reservoir having a residual water saturation within the recovery zone of not more than 30 percent of the pore space.

The invention may be carried out in an oil reservoir having an initial residual water saturation of more than 30 percent. However, the presence of water in excess of this amount will decrease the concentration of sulfuric acid formed for any given amounts of injected sulfur dioxide and oxygen and, in addition, will make the injection of these gaseous reactants more difficult because of the resulting low relative permeability of the reservoir to gas. Therefore, it is desirable in those cases where the reservoir exhibits a high water saturation, i.e., in excess of 30 percent, to reduce the water saturation of the recovery zone, particularly in the vicinity of the injection system, to 30 percent or below. This may be accomplished by gaseous displacement of the excess water. Thus, in a preferred embodiment of the invention carried out in a reservoir exhibiting a water saturation in excess of 30 percent, gas initially is injected through the injecting system to reduce the water saturation. Desirably, such gas injection is maintained until the water saturation throughout the recovery zone is within the range of 10–30 percent. It will be recognized that in some instances it may prove to be impractical to reduce the water saturation throughout the recovery zone to a value within the aforementioned range. However, it is preferred in any case to maintain the injection of gas until the water saturation within at least 20 percent of the recovery zone next adjacent the injection system is within the range of 10–30 percent.

The gas injected during this phase of operation may be one, such as natural gas, which is inert with regard to the reactions involved in the present invention. However, it is preferred in this embodiment of the invention to inject an oxygen-containing gas and more specifically air. While, as noted above, this may result in some oxidation of the formation hydrocarbons, the injection of the oxygen-containing gas at this point will avoid the expense associated with the injection of a gas which is not utilized in the reactions within the reservoir.

As noted previously, the sulfur dioxide and oxygen-containing gas may be injected simultaneously as a mixture or successively, preferably as a plurality of alternate slugs of sulfur dioxide and oxygen-containing gas. Regardless of the mode of injecting these gaseous reactants, it is desirable to obtain distribution of the sulfonating agent throughout an appreciable extent of the reservoir. Thus, it is preferred to inject the sulfur dioxide and oxygen-containing gas in a total cumulative amount of at least ten percent of the total pore volume of the recovery zone. Even greater amounts of these reactants are desirable and, where practical, it is preferred to continue injection of the sulfur dioxide and oxygen-containing gas through the injection system until at least one and desirably both of these reactants traverse the recovery zone and reach the production system. This may be determined by producing one or more wells comprising the production system and monitoring the gaseous effluent therefrom for the sulfur dioxide and/or oxygen containing gas.

Regardless of the total cumulative amount of the reactants injected, they should be used in approximate stoichiometric amounts with any deviation from this criterion generally limited to a 50 percent stoichiometric excess of oxygen or sulfur dioxide. Therefore, it is preferred in carrying out the invention to inject the sulfur dioxide and oxygen-containing gas in amounts resulting in a volumetric ration of oxygen to sulfur dioxide within the range of $1/3$ to $3/4$. Thus, if air of a 20 percent oxygen content is used, it should be injected in an amount within the range of $1 2/3$ to $3 3/4$ cubic feet for every cubic foot of sulfur dioxide injected. It normally will be preferred to avoid a stoichiometric excess of sulfur dioxide since it usually will be less subject to competing reactions than the injected oxygen.

Subsequent to the introduction of the sulfur dioxide and oxygen-containing gas into the recovery zone, an aqueous flooding medium is injected into the recovery zone through the injection system. Preferably, a period of at least seven days is allowed between the time at which the recovery zone is first contacted by the gaseous reactants and the time at which the injection of the aqueous flooding medium is initiated. This will enable significant amounts of sulfoxy acids to be formed in the recovery zone adjacent the injection system. Since the flooding medium will advance through the recovery zone at a much slower rate than the previously injected gases, the contact time of the sulfonating agent within the reservoir will increase with distance from the injection system. This, of course, will tend to increase the concentration of sulfoxy acids at locations remote from the injection system.

The aqueous flooding medium may be merely fresh water or brine. Preferably, however, the flooding medium comprises an aqueous alkaline solution in order to effect neutralization of the sulfoxy acids to their corresponding salts. In this regard, the conversion of a sulfoxy acid group to a salt increases the hydrophilic character of this portion of the molecule and thus increases the interfacial activity of the molecule. The preferred solutions for use in this embodiment of the invention are the alkali metal and ammonium bases and, more specifically, the alkali metal and ammonium hydroxides and the alkali metal and ammonium carbonates. Thus, the flooding medium may comprise an aqueous solution of sodium, potassium, or ammonium hydroxides or carbonates as well as the hydroxides and carbonates of the other alkali metals. The carbonates usually will be preferred over the corresponding hydroxides. In this regard, the carbonates will function as buffering agents in pH range (on the order of about 7.5 to 9.5) most conducive to the production of low interfacial tension by petroleum sulfonates. In addition, the carbonates in many cases will tend to enhance the water wettability of the reservoir.

The relatively strong water-soluble organic bases also may be used in carrying out this embodiment of the invention. Thus, aqueous solutions of organic bases such as ethylamine, isopropylamine, triethanolamine and like compounds may be utilized to effect neutralization of the sulfoxy acids. It usually will be desired, however, to utilize the inorganic bases noted above in order to produce alkali metal or ammonium salts of the sulfoxy acids. Such salts exhibit a high surface activity and are less readily absorbed from solution than are the neutralization complexes resulting from the use of the various organic bases.

Of the inorganic bases, it usually will be preferred to utilize an aqueous solution of sodium hydroxide or carbonate (preferably, the carbonate for the reasons given above) in a concentration within the range of .05 to 1.5% by weight. In this regard, the petroleum sulfonates and sulfates are very effective in reducing interfacial tensions in solutions of at least .05% by weight of sodium hydroxide or sodium carbonate. On the other hand, the adsorption of petroleum sulfates or sulfonates on rock surfaces is increased by the higher concentrations. Thus, it usually will be undesirable for the concentration of sodium hydroxide or carbonate to exceed a value of about 1.5% by weight.

Sufficient amounts of the carbonate or hydroxide should be injected in order to neutralize unreacted sulfuric acid remaining in the formation water, to satisfy the absorptive tendency of the formation rock surfaces for the alkali, and to leave a residual concentration of about .05% in the flood water. In view of the considerations, it is preferred to inject the solution of sodium hydroxide or sodium carbonate in an amount of at least 20% pore volume of the recovery zone. This solution desirably will be graded from an initial concentration of about 1.5% by weight to a final concentration of about .05% by weight. The alkaline solution then may be moved through the reservoir by the injection of a suitable fluid such as oil-field brine.

Having described specific embodiments of the instant invention, it will be understood that further modifications thereof may be suggested to those skilled in the art, and it is intended to cover all such modifications as fall within the scope of the appended claims.

What is claimed is:

1. In the production of oil from a subterranean oil reservoir containing water therein and penetrated by spaced injection and production systems defining a recovery zone of said reservoir, the method comprising:
    (a) introducing into said recovery zone of said reservoir and into contact with water within said recovery zone gaseous sulfur dioxide and an oxygen-containing gas whereby there is produced within said recovery zone sulfuric acid which reacts with constituents of said oil to produce surface-active organic sulfoxy acids,
    (b) thereafter introducing into said recovery zone via said injection system an aqueous flooding medium to displace oil to said production system, and
    (c) recovering oil from said production system.

2. The method of claim 1 wherein said sulfur dioxide and oxygen-containing gas are sequentially introduced into said recovery zone by injection through said injection system.

3. The method of claim 2 wherein said sulfur dioxide in injected prior to said oxygen-containing gas.

4. The method of claim 3 wherein said sulfur dioxide is injected in a plurality of slugs and said oxygen-containing gas is injected in a plurality of slugs alternately with said slugs of sulfur dioxide.

5. The method of claim 1 wherein the gas saturation and the water saturation of said recovery zone at the time of initiating sulfur dioxide injection are respectively at least 30 percent and within the range of 10–30 percent.

6. The method of claim 1 wherein the volumetric ratio of injected oxygen to sulfur dioxide is within the range of ⅓ to ¾.

7. The method of claim 1 wherein said sulfur dioxide and oxygen are introduced into said recovery zone by injection through said injection system.

8. The method of claim 7 wherein said recovery zone exhibits a water saturation in excess of 30 percent and further comprising the step of, prior to the injection of sulfur dioxide in accordance with step (a) of claim 1, injecting a displacing gas through said injection system in an amount sufficient to reduce the water saturation within at least 20 percent of the recovery zone next adjacent said injection system to a value within the range of 10–30 percent.

9. The method of claim 8 wherein said displacing gas contains oxygen.

10. The method of claim 8 wherein said displacing gas is injected in an amount sufficient to reduce the water saturation throughout said recovery zone to a value within the range of 10–30 percent.

11. The method of claim 7 wherein said sulfur dioxide and oxygen-containing gas are introduced in a total cumulative amount of at least 10 percent of the total pore volume of said recovery zone.

12. The method of claim 7 wherein the injection of said sulfur dioxide and oxygen-containing gas are maintained until at least one of said sulfur dioxide and oxygen-containing gas reaches said production system.

13. The method of claim 7 wherein the injection of said aqueous flooding medium is initiated at least seven days after the first injection of said sulfur dioxide and oxygen-containing gas.

14. The method of claim 1 wherein said flooding medium comprises an aqueous alkaline solution to neutralize said sulfoxy acids and produce salts thereof.

15. The method of claim 1 wherein said flooding medium comprises an aqueous solution of a base selected from the group consisting of the alkali metal hydroxides, the alkali metal carbonates, ammonium hydroxide and ammonium carbonate.

16. The method of claim 1 wherein said flooding medium comprises an aqueous solution of a base selected from the group consisting of sodium hydroxide and sodium carbonate in a concentration within the range of 0.05 to 1.5 weight percent.

17. The method of claim 16 wherein said aqueous solution of a base is injected in an amount of at least 20 percent pore volume of said recovery zone.

18. The method of claim 16 wherein said base is sodium carbonate.

References Cited
UNITED STATES PATENTS

| | | | |
|---|---|---|---|
| 2,675,083 | 4/1954 | Bond et al. | 166—42 X |
| 3,036,631 | 5/1962 | Holbrook | 166—38 X |
| 3,167,119 | 1/1965 | Meadors | 166—9 |
| 3,259,187 | 7/1966 | Prats et al. | 166—38 X |
| 3,326,289 | 6/1967 | Mulder | 166—9 X |
| 3,333,632 | 8/1967 | Kyte | 166—9 |
| 3,344,858 | 10/1967 | Gilchrist et al. | 166—38 X |

CHARLES E. O'CONNELL, *Primary Examiner.*

I. A. CALVERT, *Assistant Examiner.*